(12) United States Patent
Zhang et al.

(10) Patent No.: US 12,711,657 B1
(45) Date of Patent: Aug. 18, 2026

(54) MATERIAL HANDLING EQUIPMENT, CONTROLLER, AND METHOD FOR DETERMINING EXTRINSIC PARAMETER

(71) Applicant: VisionNav Robotics USA Inc., Acworth, GA (US)

(72) Inventors: Zhenpeng Zhang, Acworth, GA (US); Bingchuan Yang, Acworth, GA (US); Siqi Yang, Acworth, GA (US); Tingwei Wu, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/370,291

(22) Filed: Oct. 27, 2025

(51) Int. Cl.

| | |
|---|---|
| ***G06T 7/00*** | (2017.01) |
| ***B66F 9/06*** | (2006.01) |
| ***B66F 9/075*** | (2006.01) |
| ***G06T 3/40*** | (2006.01) |
| ***G06T 7/73*** | (2017.01) |
| ***G06T 7/80*** | (2017.01) |
| *G05D 1/667* | (2024.01) |
| *G05D 105/28* | (2024.01) |

(52) U.S. Cl.
CPC ................ *G06T 7/73* (2017.01); *B66F 9/063* (2013.01); *B66F 9/0755* (2013.01); *G06T 3/40* (2013.01); *G06T 7/80* (2017.01); *G05D 1/667* (2024.01); *G05D 2105/28* (2024.01); *G06T 2207/10028* (2013.01)

(58) Field of Classification Search
CPC .... G06T 7/73; G06T 3/40; G06T 7/80; G06T 2207/10028; G06T 7/00; B66F 9/063; B66F 9/0755; G05D 1/667; G05D 2105/28
USPC ........................................................... 701/50
See application file for complete search history.

(56) References Cited

U.S. PATENT DOCUMENTS 12,469,143 B1 * 11/2025 Yang ......................... G06T 7/13
12,492,109 B1 * 12/2025 Wu ....................... B66F 9/0755
(Continued)

FOREIGN PATENT DOCUMENTS

CN 115877400 A 3/2023
CN 116125445 A 5/2023
(Continued)

OTHER PUBLICATIONS

"How to convert direction vector to euler angles" Retrieved on Oct. 10, 2023 from https://stackoverflow.com/questions/21622956/how-to-convert-direction-vector-to-euler-angles, 5 pages.

*Primary Examiner* — Shardul D Patel
(74) *Attorney, Agent, or Firm* — MUNCY, GEISSLER, OLDS & LOWE, P.C.

(57) ABSTRACT

Some embodiments of the present disclosure relate to a material handling equipment, a controller, and a method for determining an extrinsic parameter. The material handling equipment includes a controller. The controller is configured to execute program instructions, to implement the following actions: obtaining a relative pose between a carrier and the material handling equipment as a first pose; obtaining a second pose by using a sensor, the second pose being a pose of the carrier or a pose of a partial structure of the carrier; and determining, based on the first pose and the second pose, an extrinsic parameter of the sensor relative to the material handling equipment.

19 Claims, 9 Drawing Sheets

(56) References Cited

U.S. PATENT DOCUMENTS

| | | | | |
|---|---|---|---|---|
| 2023/0356990 | A1* | 11/2023 | Houston .................. | B60D 1/62 |
| 2023/0410360 | A1* | 12/2023 | Dubbelman ............. | G06T 7/75 |

FOREIGN PATENT DOCUMENTS

| | | | |
|---|---|---|---|
| CN | 116165637 | A | 5/2023 |
| CN | 116400334 | A | 7/2023 |

* cited by examiner

MATERIAL HANDLING EQUIPMENT, CONTROLLER, AND METHOD FOR DETERMINING EXTRINSIC PARAMETER

TECHNICAL FIELD

Various example embodiments relate to the field of warehousing, logistics, and manufacturing, and more specifically, to a material handling equipment, a controller, and a method for determining an extrinsic parameter.

BACKGROUND

In the field of modern warehousing and logistics, efficient circulation of cargoes is crucial to enterprise operation. An automated guided forklift, as a new-generation intelligent logistics device, gradually becomes one of key technologies for improving warehousing efficiency and reducing operation costs. The automated guided forklift, also referred to as an AGV (Automated Guided Vehicle, automated guided vehicle), is controlled based on autonomous driving technologies and intelligent algorithms, and can implement autonomous navigation, handling, and stacking, so that a labor shortage problem is effectively alleviated, and overall efficiency of logistics operation is significantly improved.

Precise operation of the automated guided forklift depends on determining of an extrinsic parameter from a sensor to the automated guided forklift. The determining process is a key to ensure that a coordinate system of the sensor is accurately aligned with a coordinate system of the automated guided forklift, directly affects precision of the automated guided forklift for environment perception, path planning, and cargo handling, and is of great significance to improving efficiency and safety of warehousing operation.

BRIEF DESCRIPTION OF THE DRAWINGS

Some example embodiments will now be described with reference to the accompanying drawings. For ease of description of embodiments of present disclosure, the accompanying drawings necessary for describing the embodiments of present disclosure or the existing technologies are briefly described below. It is clear that the accompanying drawings in the following descriptions are only a part of the embodiments of present disclosure. A person skilled in the art can obtain the accompanying drawings of other embodiments based on examples in the accompanying drawings without creative work.

DETAILED DESCRIPTION OF THE DISCLOSURE

Figure 1:
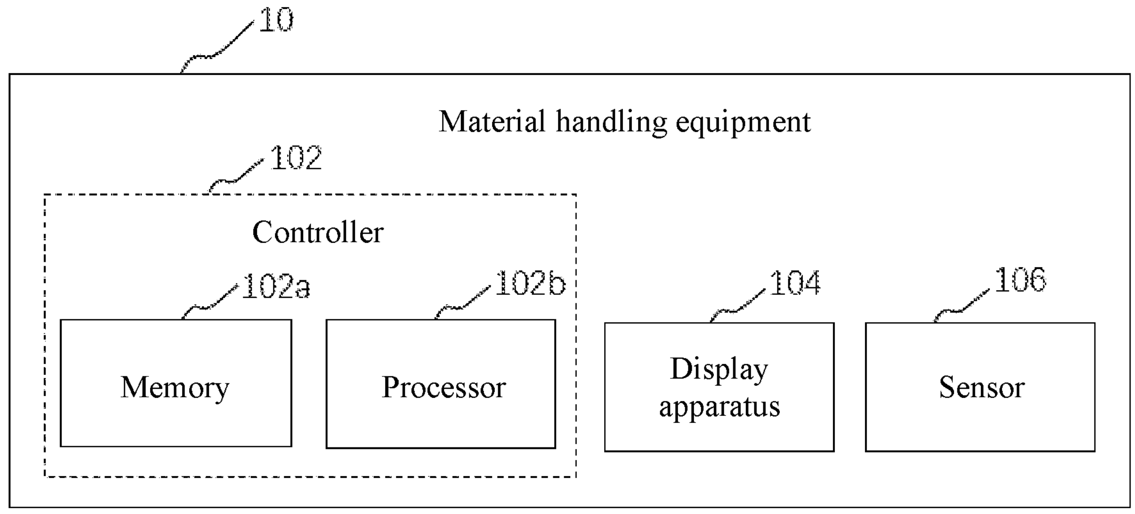
FIG. 1 is a schematic diagram of modules of a material handling equipment according to some embodiments of the present disclosure.

The following descriptions are provided with reference to the accompanying drawings, to help understand the present disclosure. The following description focus on specific implementations and embodiments of the present disclosure. The focus is provided to help describe teaching content, and should not be construed as a limitation to the scope or applicability of the teaching content. However, other embodiments may be used based on the teaching content disclosed in the present disclosure.

The terms “include”, “contain” and any other variants in the present disclosure mean to cover the non-exclusive inclusion, for example, a process, a method, a system, an apparatus, a product, or a device that includes a list of actions or units is not necessarily limited to those expressly listed actions or units, but may include other actions or units not expressly listed or inherent to such a process, a method, a system, an apparatus, a product, or a device.

The following disclosure provides a plurality of implementations or examples, and can be used to implement different features of the present disclosure. Specific examples of components and configurations described below are used to simplify the present disclosure. It may be conceived that these descriptions are merely for exemplary objectives, and are not intended to limit the present disclosure. For example, in the following descriptions, the terms “first”, “second”, and the like are for distinguishing between different objects, instead of describing a particular sequence of the objects. For example, without departing from the scope of the present disclosure, a first parameter may be referred to as a second parameter, and similarly, the second parameter may be referred to as the first parameter. In addition, in the present disclosure, component symbols and/or numbers may be repeatedly used in a plurality of embodiments. This repetition is used for an objective of simplicity and clarity, and does not indicate a relationship between different embodiments and/or configurations that are discussed.

In addition, for ease of description, relative spatial terms such as "below", "under", "lower", "above", "upper", "left", and "right" may be used in this specification to describe a relationship between one component or feature and another component or feature as illustrated in the figures. In addition to orientations depicted in the figure, the relative spatial terms are intended to cover different orientations of an apparatus during use or operation. A device may be oriented in another manner (rotated by 90 degrees or at another orientation), and the relative spatial terms used in this specification may also be correspondingly explained. It should be understood that, when a component is "connected to" or "coupled to" another component, the component may be directly connected to or coupled to the another component, or an intermediate component may exist.

Although a numerical range and a parameter used to define a broad scope of the present disclosure are approximate values, relevant values in specific embodiments are presented as precisely as possible herein. However, any value essentially inevitably has a standard deviation caused by an individual test method. Herein, the term "approximate" usually means that an actual value is within plus or minus 10%, 5%, 1%, or 0.5% of a particular value or range. Alternatively, the term "approximate" represents that an actual value falls within an acceptable standard error of an average value, and is determined in consideration of a person of ordinary skill in the art to which the present disclosure belongs. It may be understood that, except experimental examples, or unless otherwise clearly stated, all ranges, quantities, values, and percentages used herein are modified by the term "approximate". Therefore, unless otherwise specified to the contrary, numerical parameters disclosed in this specification and appended claims are approximate values, and may be changed as required. These numerical parameters should be understood as at least a specified number of significant figures and a numerical value obtained by using a common carry method. Herein, a value range is represented as being from one endpoint to another endpoint or between two endpoints. Unless otherwise specified, numerical ranges described herein all include endpoints.

FIG. 1 is a schematic diagram of modules of a material handling equipment according to some embodiments of the present disclosure.

As shown in FIG. 1, a material handling equipment 10 includes a controller 102, a display apparatus 104, and a sensor 106. The controller 102 is operatively coupled to the display apparatus 104 and the sensor 106. The controller 102 may cooperate with the display apparatus 104 and the sensor 106 to implement a method for determining an extrinsic parameter provided in the present disclosure.

The controller 102 may include a memory 102*a* and a processor 102*b*. The controller 102 may be disposed on the material handling equipment 10. It should be noted that whether the controller 102 is implemented by using hardware, software, or a combination of hardware and software is not limited in the present disclosure. In some embodiments of the present disclosure, the controller 102 may be a plug and play apparatus. In some embodiments of the present disclosure, the controller 102 may be connected to the material handling equipment 10 in a wired or wireless manner.

The memory 102*a* may be an integrated element. The memory 102*a* may be considered as including a plurality of storage units. Information, for example, but not limited to, data information such as a point cloud and a pose of the material handling equipment 10, may be separately stored in different storage units or stored in a same storage unit.

The processor 102*b* may be an integrated element. The processor 102*b* may include a plurality of processing units. The processor 102*b* may read required data information from the memory 102*a*. The processor 102*b* may store data information in the memory 102*a*. The processor 102*b* may receive and process an input (such as a touch operation) of a user for the display apparatus 104 or data sensed by the sensor 106. The processor 102*b* is operatively coupled to the memory 102*a*, the display apparatus 104, and the sensor 106. The processor 102*b* may cooperate with the memory 102*a*, the display apparatus 104, and the sensor 106 to implement the method for determining the extrinsic parameter provided in the present disclosure.

The display apparatus 104 may be a touchscreen. The display apparatus 104 may alternatively be a non-touch screen. The display apparatus 104 may be disposed on the material handling equipment 10. Alternatively, the display apparatus 104 may not be disposed on the material handling equipment 10. Alternatively, the material handling equipment 10 may not include the display apparatus 104. The display apparatus 104 may be disposed at a remote end of the material handling equipment 10, for example, but not limited to, a remote control room.

The sensor 106 may be an integrated element. The sensor 106 may include a plurality of sensor elements. The sensor 106 may be, but is not limited to, a complementary metal-oxide-semiconductor sensor, a charge-coupled device sensor, a time of flight (TOF) sensor, or a laser radar. The sensor 106 may send collected information about a carrier to the controller 102. The sensor 106 may be disposed on the material handling equipment 10. In some embodiments of the present disclosure, the material handling equipment 10 may not include the sensor 106. The sensor 106 may be manually mounted on the material handling equipment 10 by a user before the user uses the material handling equipment 10.

The material handling equipment 10 may be a device that can automatically or semi-automatically execute a handling task. Common forms of the material handling equipment 10 include a forklift, an automated guided vehicle (AGV, Automated Guided Vehicle), an autonomous mobile robot (AMR, Autonomous Mobile Robot), a humanoid robot, a robotic arm (Robotic Arm), and the like. In some embodiments of the present disclosure, the material handling equipment 10 may be an unmanned vehicle, for example, an automated guided forklift, used in a warehouse.

Figure 2:
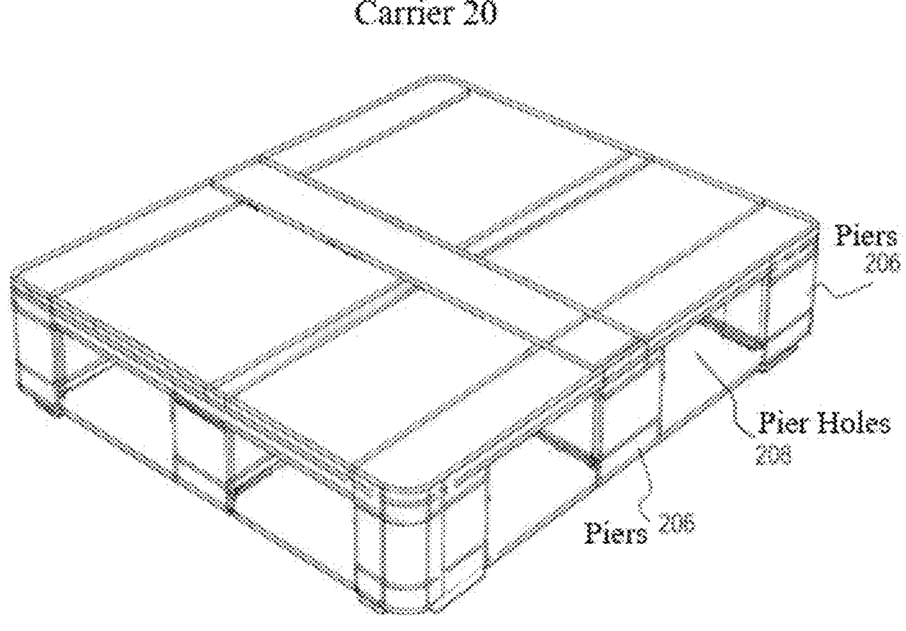
FIG. 2 is a schematic diagram of a structure of a carrier according to some embodiments of the present disclosure.
Figure 3:
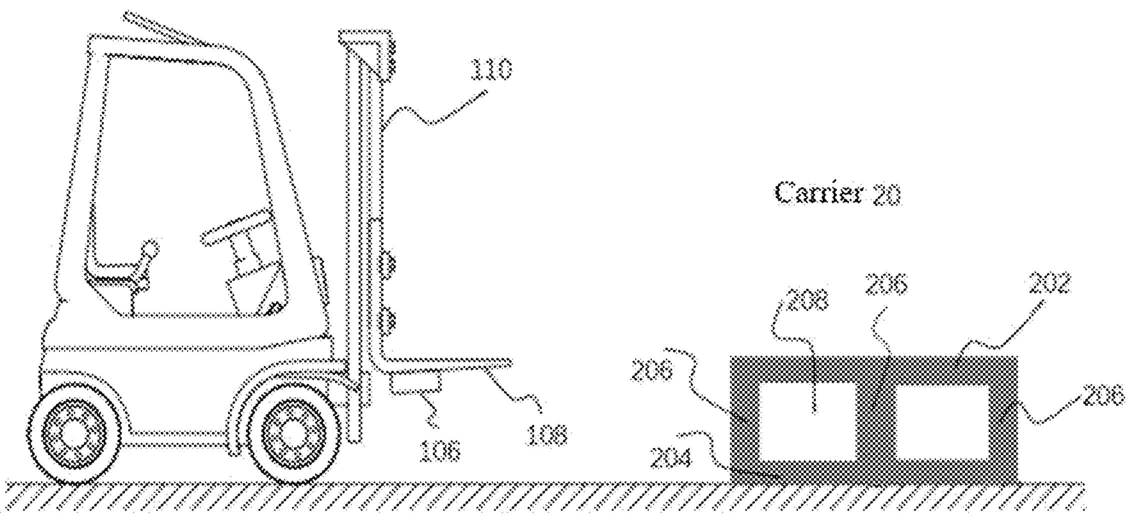
FIG. 3 is a diagram of a scenario in which a material handling equipment faces a carrier according to some embodiments of the present disclosure.

FIG. 2 is a schematic diagram of a structure of a carrier according to some embodiments of the present disclosure. FIG. 3 is a diagram of a scenario in which a material handling equipment faces a carrier according to some embodiments of the present disclosure.

As shown in FIG. 2 and FIG. 3, a carrier 20 is a pallet. The carrier 20 includes upper beams 202, lower beams 204, piers 206, and pier holes 208. The piers 206 are disposed between the upper beams 202 and the lower beams 204. There are a plurality of piers 206. The pier holes 208 are formed between the plurality of piers 206. During operation, a fork of an automated guided forklift may be inserted into the pier holes 208, to fork the carrier 20.

In some embodiments of the present disclosure, the carrier 20 may be any object conveniently handled. In some embodiments of the present disclosure, the carrier 20 may alternatively be a material cage, a material box, a pallet box, an oil drum, or a cardboard box.

A material handling equipment shown in FIG. 3 is an automated guided forklift. However, it should be understood that, in another embodiment of the present disclosure, the material handling equipment may alternatively be in another form. A carrier shown in FIG. 3 is a pallet. However, it should be understood that, in another embodiment of the present disclosure, the carrier may alternatively be in another form.

As shown in FIG. 3, the material handling equipment 10 includes a fork 108 and a gantry 110. The sensor 106 may be disposed on the material handling equipment 10, so that a field of view of the sensor 106 can cover the carrier 20, or the ground and the carrier 20. The sensor 106 may be disposed on the fork 108 or the gantry 110. In a specific embodiment of the present disclosure, as shown in FIG. 3, the sensor 106 is disposed at a root of the fork 108.

As shown in FIG. 3, the carrier 20 whose pier holes have a known size is located on the ground in front of the material handling equipment 10. The size of the pier holes of the carrier 20 may be obtained through measurement, detection, or the like. After an extrinsic parameter of the sensor 106 relative to the material handling equipment 10 is determined, the material handling equipment 10 can accurately recognize a spatial relationship between an environment and the material handling equipment 10, and accurately fork the carrier and a cargo on the carrier.

Figure 4:
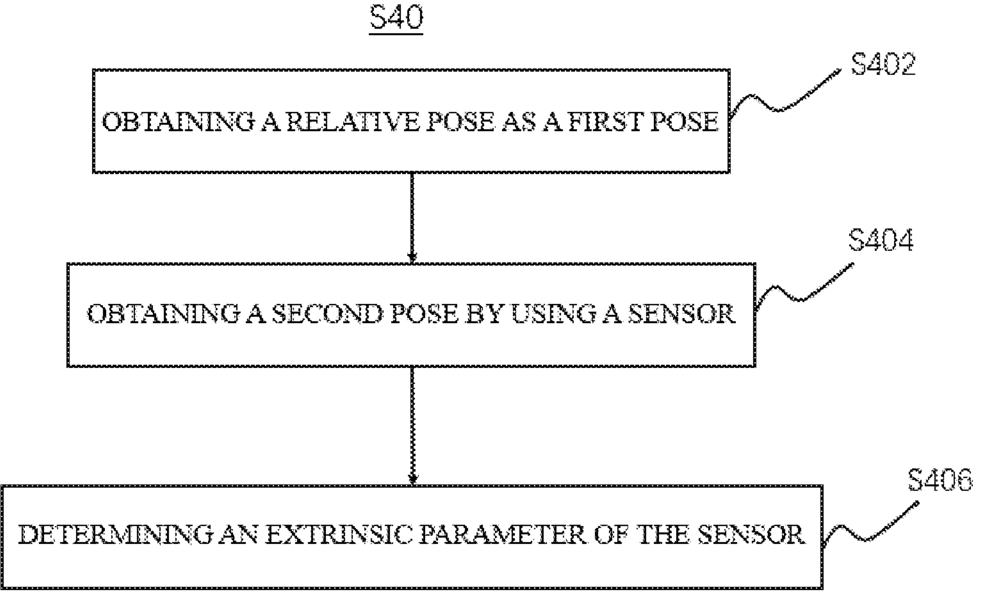
FIG. 4 is a schematic flowchart of a method for determining an extrinsic parameter according to some embodiments of the present disclosure.

FIG. 4 is a schematic flowchart of a method for determining an extrinsic parameter according to some embodiments of the present disclosure. When the carrier 20 is detected by using the method for determining the extrinsic parameter provided in this embodiment of the present disclosure, the material handling equipment 10 first moves in front of the carrier 20, so that the fork 108 of the material handling equipment 10 faces the carrier 20. Then, the sensor 106 may collect information about the carrier 20. After the information about the carrier 20 is collected, the controller 102 performs subsequent processing on the information, and performs corresponding actions, to finally determine the extrinsic parameter of the sensor 106 relative to the material handling equipment 10.

As shown in FIG. 4, the method S40 for determining the extrinsic parameter includes action S402, action S404, and action S406.

The method S40 for determining the extrinsic parameter is performed by the controller 102 coupled to the display apparatus 104 and the sensor 106. More specifically, program instructions stored in the memory 102*a* are configured to enable, by using the processor 102*b*, the material handling equipment 10 to perform the method S40 for determining the extrinsic parameter.

Action S402: Obtain a relative pose between a carrier and the material handling equipment as a first pose.

In some embodiments of the present disclosure, action S402 includes: arranging the carrier 20 and the material handling equipment 10 at a preset relative pose, and obtaining the first pose between the carrier 20 and the material handling equipment 10 based on the preset relative pose. For example, the preset relative pose may be directly used as the first pose between the carrier 20 and the material handling equipment 10. Specifically, the preset relative pose may be represented by using a three-dimensional coordinate value, a roll angle, a pitch angle, and a yaw angle of the carrier 20, or the preset relative pose is represented by using a transformation matrix from the carrier 20 to the material handling equipment 10.

Figure 5:
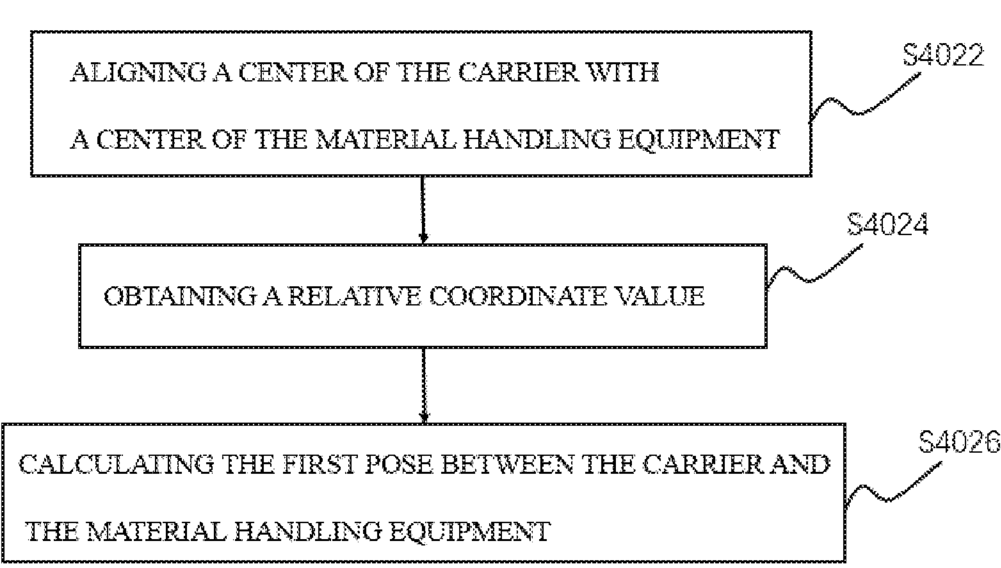
FIG. 5 is a schematic diagram of a specific procedure of obtaining a relative pose between a carrier and a material handling equipment as a first pose according to some other embodiments of the present disclosure.

FIG. 5 is a schematic diagram of a specific procedure of obtaining a relative pose between a carrier and a material handling equipment as a first pose according to some other embodiments of the present disclosure.

As shown in FIG. 5, action S402 includes action S4022, action S4024, and action S4026. Action S4022: Align a center of the carrier 20 with a center of the material handling equipment 10, to enable two of three-dimensional relative coordinate values of the carrier 20 and the material handling equipment 10 to be zero, and enable a relative roll angle, a relative pitch angle, and a relative yaw angle of the carrier 20 and the material handling equipment 10 to be preset values. In some embodiments of the present disclosure, the center of the carrier 20 may be aligned with the center of the material handling equipment 10 by using a laser level. In some other embodiments of the present disclosure, the center of the carrier 20 may alternatively be aligned with the center of the material handling equipment 10 by using another tool. Specifically, in some embodiments of the present disclosure, a Y-axis relative coordinate value Y' and a Z-axis relative coordinate value Z' in the three-dimensional relative coordinate values of the carrier 20 and the material handling equipment 10 may be enabled to be zero. In some other embodiments of the present disclosure, an X-axis relative coordinate value X' and a Y-axis relative coordinate value Y' in the three-dimensional relative coordinate values of the carrier 20 may be enabled to be zero. In some other embodiments of the present disclosure, an X-axis relative coordinate value X' and a Z-axis relative coordinate value Z' in the three-dimensional relative coordinate values of the carrier 20 may be enabled to be zero. In some embodiments of the present disclosure, the preset values of the relative roll angle, the relative pitch angle, and the relative yaw angle are zero. In some other embodiments of the present disclosure, the preset values of the relative roll angle, the relative pitch angle, and the relative yaw angle may alternatively be not zero. Through action S4022, the center of the carrier 20 is aligned with the center of the material handling equipment 10 in advance, so that a measurement load and a computational load when the first pose between the carrier 20 and the material handling equipment 10 is obtained can be reduced, and an input error is reduced. Therefore, the first pose between the carrier 20 and the material handling equipment 10 is more accurately determined subsequently. Action S4024: Obtain a relative coordinate value other than the two three-dimensional relative coordinate values obtained in action S4022 in the three-dimensional relative coordinates. In action S4022, the center of the carrier 20 is aligned with the center of the material handling equipment 10, and two of the three-dimensional relative coordinate values of the carrier 20 and the material handling equipment 10 are enabled to be zero. Therefore, another relative coordinate value of the three-dimensional relative coordinates may be directly obtained through measurement, detection, or the like. Action S4026: Calculate the first pose between the carrier and the material handling equipment based on the three-dimensional relative coordinate value, the relative roll angle, the relative pitch angle, and the relative yaw angle. Specifically, a transformation matrix from the carrier 20 to the material handling equipment 10 may be determined based on the three-dimensional relative coordinate value, the relative roll angle, the relative pitch angle, and the relative yaw angle of the carrier 20, and the transformation matrix from the carrier 20 to the material handling equipment 10 represents the first pose between the carrier 20 and the material handling equipment 10.

Action S404: Obtain a second pose by using a sensor. The second pose may be a pose of the carrier 20 or a pose of a partial structure of the carrier 20. In some embodiments of the present disclosure, the partial structure of the carrier 20 may be piers. In some other embodiments of the present disclosure, the partial structure of the carrier 20 may alternatively be another structure. Specifically, a pose of at least a partial structure of the carrier is obtained by using the sensor. A coordinate origin of the pose of at least the partial structure may be a spatial disposition point of the sensor, or a reference point that has a known relative pose with the spatial disposition point of the sensor.

Figure 6:
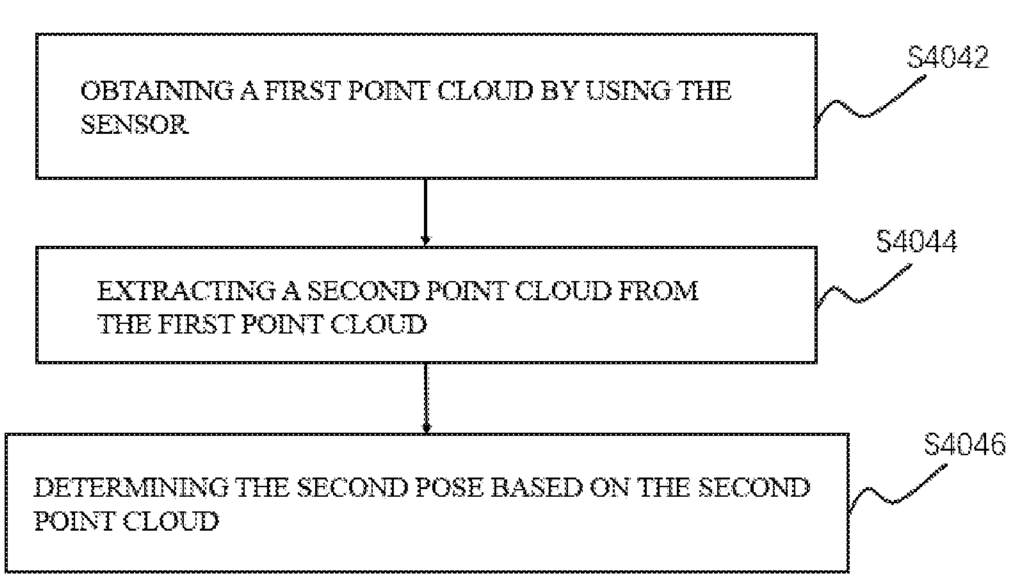
FIG. 6 is a schematic diagram of a specific procedure of obtaining a second pose by using a sensor according to some embodiments of the present disclosure.

FIG. 6 is a schematic diagram of a specific procedure of obtaining a second pose by using a sensor according to some embodiments of the present disclosure.

As shown in FIG. 6, action S404 includes action S4042, action S4044, and action S4046. Action S4042: Obtain a first point cloud by using the sensor 106, the first point cloud being a point cloud obtained by sensing at least a partial structure of the carrier 20. Action S4044: Extract a second point cloud from the first point cloud. Action S4046: Determine the second pose based on the second point cloud.

In some embodiments of the present disclosure, between action S4042 and action S4044, action S404 may include action S4043. Action S4043: Perform preprocessing on the first point cloud.

Figure 7:
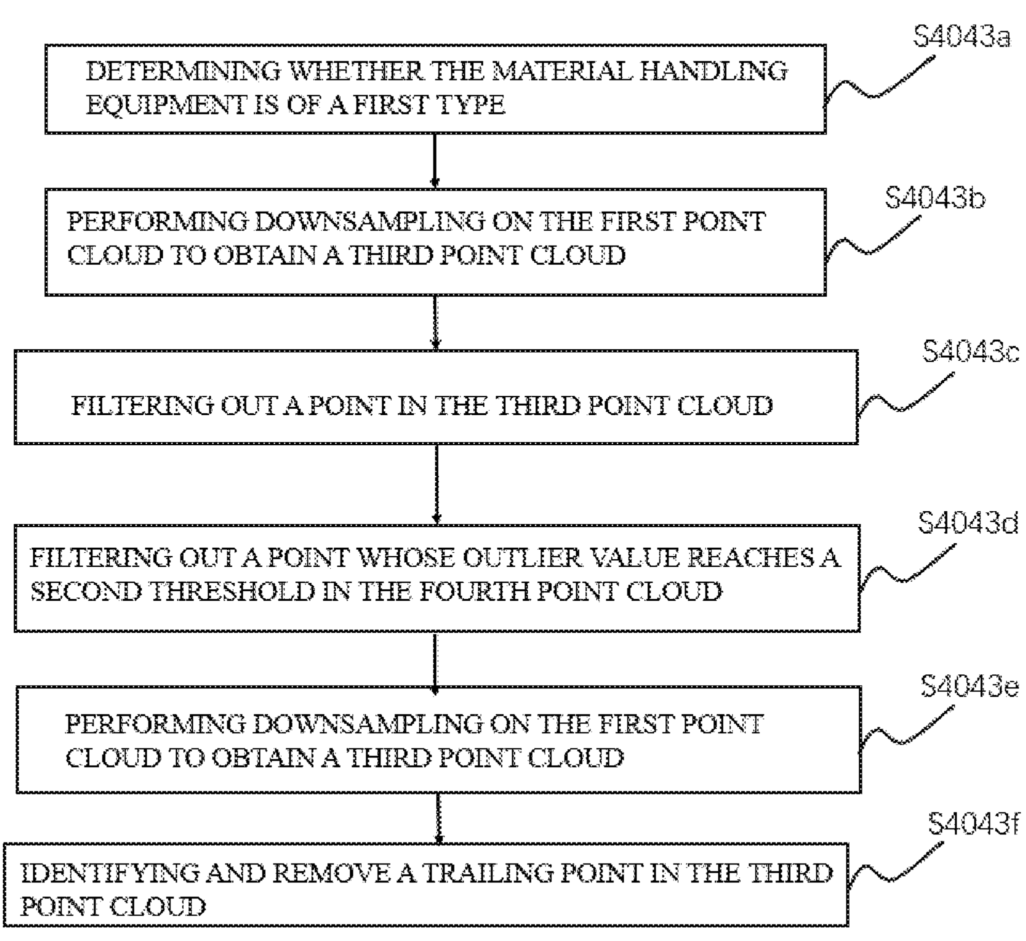
FIG. 7 is a schematic diagram of a specific procedure of performing preprocessing on a first point cloud according to some embodiments of the present disclosure.

FIG. 7 is a schematic diagram of a specific procedure of performing preprocessing on a first point cloud according to some embodiments of the present disclosure. As shown in FIG. 7, action S4043 includes action S4043*a*, action S4043*b*, action S4043*c*, action S4043*d*, action S4043*e*, and action S4043*f*. Action S4043*a*: Determine whether the material handling equipment 10 is of a first type. The material handling equipment 10 may be classified into a plurality of types based on a mounting position of the sensor 106. When the sensor 106 is mounted at a middle part of a front face of the material handling equipment 10 facing the sensor 106, the material handling equipment 10 is of the first type. When two sensors 106 are separately mounted on two sides of the front face of the material handling equipment 10, the material handling equipment 10 is of a second type. When the material handling equipment 10 is of the first type, in action S4043*b*, downsampling is performed on the first point cloud, to obtain a third point cloud. The downsampling can reduce a data volume of the first point cloud, thereby improving processing efficiency, and can further retain main information of the first point cloud. In some embodiments of the present disclosure, the downsampling may include: calculating minimum/maximum coordinates of the first point cloud in three-dimensional space, to construct a voxel grid; allocating points in the first point cloud to the corresponding voxel grid; aggregating the point cloud within the same voxel grid, to calculate representative points of the voxel grid; and replacing all points in the voxel grid with the representative points of the voxel grid. The representative point may be any point in the voxel grid. The representative point may be a center of mass in the voxel grid, a point farthest from a voxel center in the voxel grid, an extremum point on a coordinate axis (X/Y/Z) in the voxel grid, or the like. Action S4043*c*: Filter out a point in the third point cloud, to obtain a fourth point cloud, an angle between a normal of the point and a normal of an adjacent point being greater than a first threshold. In some embodiments of the present disclosure, the first threshold may range from 30° to 60°. In some embodiments of the present disclosure, the first threshold may be 30°, 45°, or 60°. In some other embodiments of the present disclosure, the first threshold may alternatively be another value or value range. Through action S4043*c*, a noise point in the third point cloud may be removed, and more accurate surface information is provided for subsequent processing. Action S4043*d*: Filter out a point whose outlier value reaches a second threshold in the fourth point cloud. Specifically, a certain quantity (for example, k) of adjacent points surrounding each point in the fourth point cloud are searched, and an average distance between each point and the adjacent points is calculated. A global average value ($\mu$) and standard deviation ($\sigma$) are calculated. When an average distance of a point exceeds the second threshold (which is usually set to $\mu+n\sigma$, where n is an empirical coefficient, for example, ranging from 1 to 3), the point is determined as an outlier and is filtered out. In some embodiments of the present disclosure, the second threshold may be a value corresponding to a position$\pm 3\sigma$ of a position of a center point of the fourth point cloud collected according to normal distribution. In some other embodiments of the present disclosure, the second threshold may alternatively be another value or value range. Through action S4043*d*, a noise point that is significantly different from surrounding points in the fourth point cloud may be deleted, thereby improving quality of point cloud data, and enabling the point cloud to be closer to a real form of the carrier 20. When the material handling equipment 10 is not of the first type, in action S4043*e*, downsampling is performed on the first point cloud, to obtain a third point cloud. Action S4043*e* is the same as action S4043*b*, and details are not described herein again. Action S4043*f*: Identify and remove a trailing point in the third point cloud. When the carrier 20 is scanned by using the sensor 106 (for example, a laser radar) mounted on a side surface of the material handling equipment 10, trailing may be caused due to relative motion of the sensor 106 and the carrier 20. The trailing may cause distortion of a geometric feature of the point cloud, and interfere with detection and identification of the carrier 20. Therefore, the trailing point in the point cloud needs to be identified and removed.

In some other embodiments of the present disclosure, action S4043 may further include: performing “region-of-interest clipping” on the first point cloud, and extracting the second point cloud from a point cloud obtained through clipping. Through “region-of-interest clipping”, a region of interest in the first point cloud may be selected, thereby filtering out an invalid point cloud and reducing a volume of processed data of point cloud data. In some embodiments of the present disclosure, “region-of-interest clipping” may include: determining a target and a range of a region of interest; defining a mathematical parameter of the region of interest; and performing “region-of-interest clipping”. In some embodiments of the present disclosure, “region-of-interest clipping” may be performed on the first point cloud together with action S4043*a*, action S4043*b*, action S4043*c*, action S4043*d*, action S4043*e*, and action S4043*f*, or may be performed separately. In some embodiments of the present disclosure, “region-of-interest clipping” may be performed on the first point cloud before or after any one of action S4043*a*, action S4043*b*, action S4043*c*, action S4043*d*, action S4043*e*, and action S4043*f*. In another embodiment of the present disclosure, only “region-of-interest clipping” may be performed on the first point cloud, or only action S4043*a*, action S4043*b*, action S4043*c*, action S4043*d*, action S4043*e*, and action S4043*f* may be performed.

Action S4044: Extract a second point cloud from the first point cloud. The extracting a second point cloud from the first point cloud includes action S40442. Action S40442: Extract, from the first point cloud, a point cloud conforming to a preset feature, as the second point cloud. The preset feature is a feature corresponding to at least the partial structure of the carrier 20. When the carrier 20 is a pallet, at least the partial structure of the carrier 20 may be, but is not limited to, piers of the pallet, pier holes of the piers of the pallet, and beams of the pallet. When the carrier 20 is a pallet, the preset feature may include one or more of the following features: one or more parameters of piers of the pallet, one or more parameters of pier holes of the pallet, one or more parameters of beams of the pallet, one or more features of the pallet, an area of the piers of the pallet, an area of the pier holes of the pallet, and continuity of upper surfaces of upper beams or lower surfaces of lower beams of the pallet. When the preset feature is the area of the piers of the pallet, the extracting, from the first point cloud, a point cloud conforming to a preset feature includes: comparing an area of a candidate pier in the first point cloud with an area of an actual pier, and when a ratio of the area of the candidate pier to the area of the actual pier is within a range of 100%±50%, determining that the candidate pier is the pier of the pallet, and extracting, from the first point cloud, a point cloud corresponding to the pier. The area of the actual pier may be directly obtained through physical measurement and calculation, and then inputted into the memory of the material handling equipment. When the preset feature is the area of the pier holes of the pallet, the extracting, from the first point cloud, a point cloud conforming to a preset feature includes: comparing an area of a candidate pier hole in the first point cloud with an area of an actual pier hole; and when a ratio of the area of the candidate pier hole to the area of the actual pier hole is within a range of 100%+30%, determining that the candidate pier hole is a pier hole of the pallet, and extracting, from the first point cloud, point clouds corresponding to the pier and the pier hole. The area of the actual pier hole may be directly obtained through physical measurement and calculation, and then inputted into the memory of the material handling equipment. The one or more parameters of the piers of the pallet may be a height of the piers, a width of the piers, a quantity of the piers, and a distance between center points of the piers. The one or more parameters of the pier holes of the pallet may be a height of the pier holes, a width of the pier holes, a quantity of the pier holes, a distance between center points of the pier holes, and a ratio of a region of the pier holes to a region of a pier surface. The one or more parameters of the beams of the pallet may be a height of the upper beams of the pallet, a width of the upper beams of the pallet, a height of the lower beams of the pallet, and a width of the lower beams of the pallet. The one or more features of the pallet may be a height of the pallet, a width of the pallet, and a shape of the pallet. When the carrier 20 is not a pallet, the preset feature may be another feature related to the carrier, and details are not described herein. A dimension of the preset feature may be obtained through measurement or detection, and then inputted into the memory of the material handling equipment. For example, when the preset feature is the width of the pallet, the extracting, from the first point cloud, a point cloud conforming to a preset feature includes: comparing a width of a candidate pallet in the first point cloud with a width of an actual pallet, and when a difference between the width of the candidate pallet and the width of the actual pallet is within a range of +7 cm, determining that the candidate pallet is the pallet, and extracting, from the first point cloud, a point cloud corresponding to the pallet. The width of the actual pallet may be directly obtained through physical measurement and calculation. When the preset feature is another foregoing parameter, a threshold range is also applicable to the foregoing threshold for the width of the pallet. Details are not described herein again.

Figure 8:
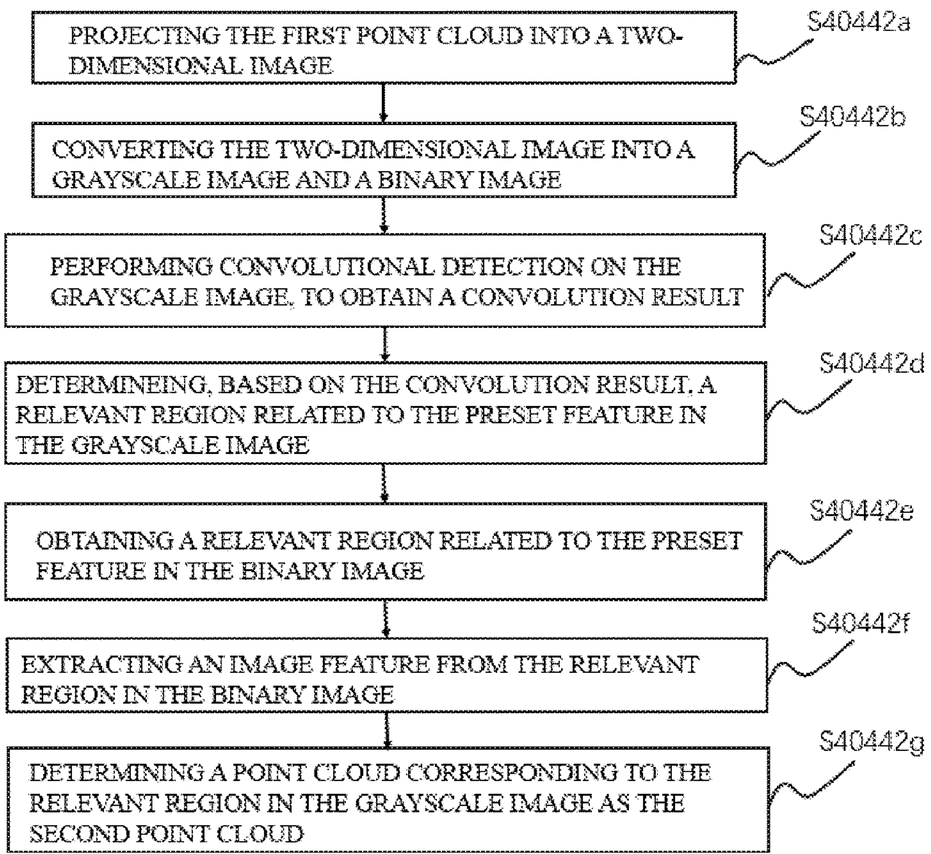
FIG. 8 is a schematic diagram of a specific procedure of extracting, from a first point cloud, a point cloud conforming to a preset feature, as a second point cloud according to some embodiments of the present disclosure.

FIG. 8 is a schematic diagram of a specific procedure of extracting, from a first point cloud, a point cloud conforming to a preset feature, as a second point cloud according to some embodiments of the present disclosure.

As shown in FIG. 8, action S40442 includes action S40442*a*, action S40442*b*, action S40442*c*, action S40442*d*, action S40442*e*, action S40442*f*, and action S40442*g*.

Action S40442*a*: Project the first point cloud into a two-dimensional image. The first point cloud may be projected into the two-dimensional image in any manner. In some embodiments of the present disclosure, the first point cloud may be projected into the two-dimensional image through perspective projection. In some other embodiments of the present disclosure, the first point cloud may be projected into the two-dimensional image through orthographic projection. In some other embodiments of the present disclosure, the first point cloud may be projected into the two-dimensional image through stereographic projection. The first point cloud is projected into the two-dimensional image, and then a subsequent calculation action is performed, so that data complexity can be reduced, a computational load is reduced, and data processing efficiency is improved.

Action S40442*b*: Convert the two-dimensional image into a grayscale image and a binary image. The two-dimensional image may be converted into the grayscale image in any manner. In some embodiments of the present disclosure, the two-dimensional image may be converted into the grayscale image by using a weighted average method. Specifically, for example, values of three channels RGB of each pixel in the two-dimensional image are first obtained. Then, a grayscale value is calculated based on the following formula: Gray=0.299 R+0.587 G+0.114 B, where R is a red channel, G is a green channel, and B is a blue channel. Finally, the grayscale value is assigned to the pixel, to form the grayscale image. In some other embodiments of the present disclosure, the two-dimensional image may be converted into the grayscale image by using a mean value method. Specifically, values of three channels RGB of each pixel are first obtained. Then, an arithmetic mean of the three channels RGB is calculated. Finally, the mean is used as a grayscale value, and the grayscale value is assigned to the pixel, to form the grayscale image. The two-dimensional image may be converted into the binary image in any manner. In some embodiments of the present disclosure, the two-dimensional image may be converted into the binary image by using a global thresholding method. Specifically, the two-dimensional image is first converted into the grayscale image. Then, a global threshold T is determined. Subsequently, each pixel is processed: if a grayscale value is greater than T, the pixel is set to white; or if the grayscale value is less than or equal to T, the pixel is set to black. Finally, the binary image including only black and white is generated based on the set pixel. In some other embodiments of the present disclosure, the two-dimensional image may be converted into the binary image by using an adaptive thresholding method. Specifically, for example, the two-dimensional image is first converted into the grayscale image. Then, the grayscale image is divided into a plurality of local regions. Subsequently, thresholds of the plurality of local regions are calculated. Then, binary processing is performed on each local region by using the threshold of the region. Finally, all the local regions are spliced, to generate the final binary image. In this way, the two-dimensional image is converted into the grayscale image, so that a data volume can be further reduced, and color information interference can be eliminated. The two-dimensional image is converted into the binary image, so that grayscale gradient information can be totally stripped, and only a shape boundary of an object is retained.

Action S40442*c*: Perform convolutional detection on the grayscale image, to obtain a convolution result. Convolutional detection may be performed on the grayscale image in any convolutional manner. In some embodiments of the present disclosure, convolutional detection may be performed on the grayscale image based on a convolution kernel (kernel). The grayscale image may be scanned by using the convolution kernel, and features such as an edge and a texture are extracted through weighted calculation.

Action S40442*d*: Determine, based on the convolution result, a relevant region related to the preset feature in the grayscale image. Through observation and comparison, the relevant region related to the preset feature in the grayscale image can be determined.

Action S40442*e*: Correspond the relevant region in the grayscale image to the binary image, to obtain a relevant region related to the preset feature in the binary image.

Action S40442*f*: Extract an image feature from the relevant region in the binary image.

Action S40442*g*: Determine a point cloud corresponding to the relevant region in the grayscale image as the second point cloud when the image feature conforms to the preset feature within a preset tolerance range. For example, when the preset feature is the distance between the center points of the pier holes of the pallet, whether a distance of a corresponding feature in the image feature is the same as the distance between the center points of the pier holes of the pallet, or whether a difference between the distance of the corresponding feature in the image feature and the distance between the center points of the pier holes of the pallet is within a threshold range is determined. When the condition is satisfied, the point cloud corresponding to the relevant region in the grayscale image may be determined as the second point cloud.

In some embodiments of the present disclosure, action S40442*d* further includes: performing non-maximum suppression (NMS) on the convolution result. A plurality of different convolution results may be obtained in action S40442*c*. Non-maximum suppression (NMS) is performed on the convolution result, so that a result that does not conform to a requirement can be excluded from the plurality of different results, and a result that is as close to a real target as possible is retained.

Action S4046: Determine the second pose based on the second point cloud.

Figure 9:
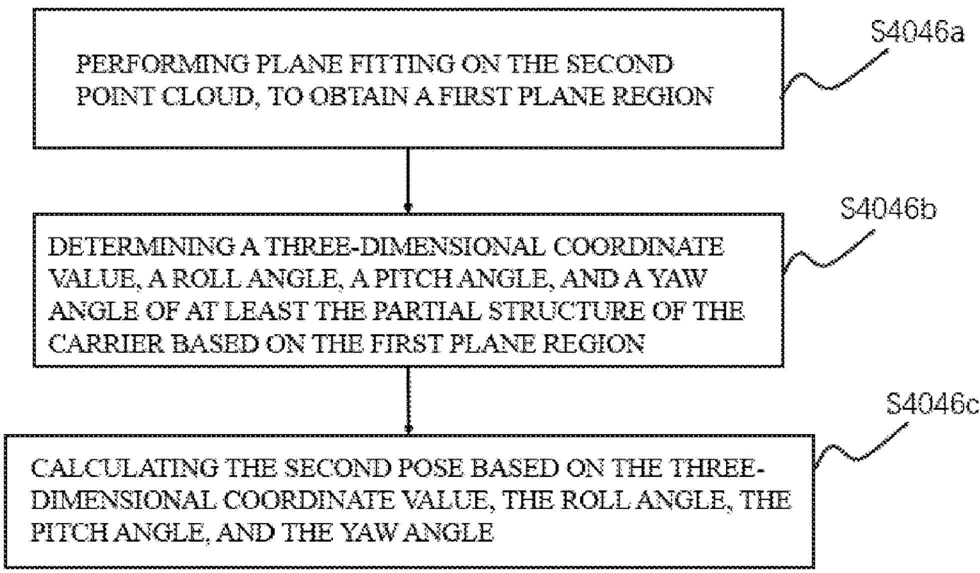
FIG. 9 is a schematic diagram of a specific procedure of determining a second pose based on a second point cloud according to some embodiments of the present disclosure.

FIG. 9 is a schematic diagram of a specific procedure of determining a second pose based on a second point cloud according to some embodiments of the present disclosure. As shown in FIG. 9, action S4046 includes action S4046*a*, action S4046*b*, and action S4046*c*.

Action S4046*a*: Perform plane fitting on the second point cloud, to obtain a first plane region.

Figure 10:
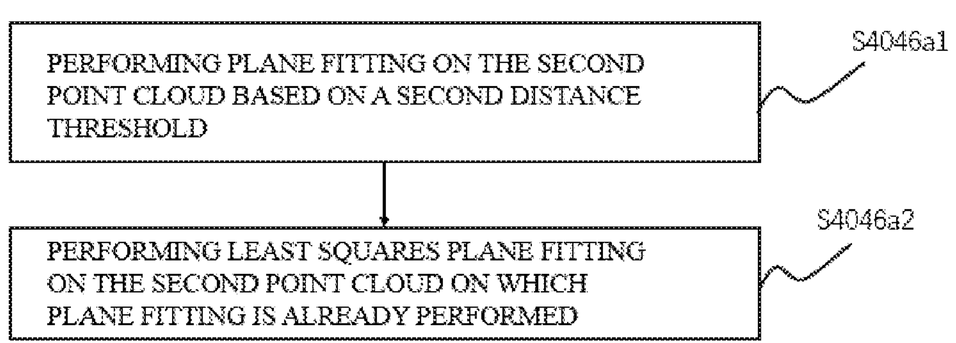
FIG. 10 is a schematic diagram of a specific procedure of performing plane fitting on a second point cloud according to some embodiments of the present disclosure.

FIG. 10 is a schematic diagram of a specific procedure of performing plane fitting on a second point cloud according to some embodiments of the present disclosure. As shown in FIG. 10, action S4046*a* includes action S4046*a*1 and action S4046*a*2. Action S4046*a*1: Perform plane fitting on the second point cloud based on a second distance threshold. In some embodiments of the present disclosure, the second distance threshold may range from 1 cm to 5 cm. In some other embodiments of the present disclosure, the second distance threshold may alternatively be another value or value range. Plane fitting may be performed on the second point cloud in any manner. In some embodiments of the present disclosure, plane fitting may be performed on the second point cloud based on a random sample consensus (RANSAC) algorithm. Action S4046*a*2: Perform least squares plane fitting on the second point cloud on which plane fitting is already performed. After plane fitting is performed on the second point cloud based on the second distance threshold, least squares plane fitting may be performed subsequently. In some embodiments of the present disclosure, least squares plane fitting is performed on the second point cloud in the following manner: A plane equation $ax+by+cz+d=0$ is set. Assuming that $c\neq 0$, the plane equation may be changed into $z=(-a/c)x+(-b/c)y+(-d/c)$. $a_0=-a/c$, $a_1=-b/c$, and $a_2=-d/c$, and in this case, $z=a_0x+a_1y+a_2$. If a series of point sets exist in a plane corresponding to the plane equation, to be specific, $\{(x, y, z)|(x, y, z)\in(xi, yi, zi), i=0, 1, 2, \ldots, n-1\}$, points in the point sets are substituted into $z=a_0x+a_1y+a_2$. A group of $a_0$, $a_1$, and $a_2$ with a smallest sum of the squares of errors according to the following formula:

$$\sum_{n=0}^{n-1}(z-zi)^2=\min,$$

and the group of $a_0$, $a_1$, and $a_2$ is used as a parameter of the plane equation.

Action S4046*a*1 and action S4046*a*2 are performed, so that exterior points (for example, noise and an interference point) not belonging to the plane can be gradually filtered out, to enable the plane equation to better conform to a real target plane region.

In some embodiments of the present disclosure, action S4046*a*1 and action S4046*a*2 may be performed separately, or action S4046*a*1 and action S4046*a*2 are performed in combination. Specifically, in some embodiments of the present disclosure, action S4046 may include only action S4046*a*1. In some embodiments of the present disclosure, action S4046 may include only action S4046*a*2. In some embodiments of the present disclosure, as shown in FIG. 10, action S4046 may include both action S4046*a*1 and action S4046*a*2.

Action S4046*b*: Determine a three-dimensional coordinate value, a roll angle, a pitch angle, and a yaw angle of at least the partial structure of the carrier based on the first plane region. After the plane equation corresponding to the second point cloud and the parameter of the plane equation are determined in action S4046*a*, a normal vector $n=[a, b, c]^T$ may be extracted from the plane equation. Then, coordinates (x, y, z) of a representative point in the first plane region are calculated. The coordinates (x, y, z) of the representative point are three-dimensional coordinate values. The representative point may be any point in the first plane region. The representative point may be one of a geometric center point, a center of mass point, a center of gravity point, or a lower edge center point of the first plane region. Subsequently, rotation angles, to be specific, the roll angle, the pitch angle, and the yaw angle, of the carrier around an X axis, a Y axis, and a Z axis may be calculated by using the normal vector n=[a, b, c]$^T$ with reference to a world coordinate system.

Action S4046*c*: Calculate the second pose based on the three-dimensional coordinate value, the roll angle, the pitch angle, and the yaw angle. For example, the three-dimensional coordinate value, the roll angle, the pitch angle, and the yaw angle may be used as the second pose of the carrier.

Figure 11:
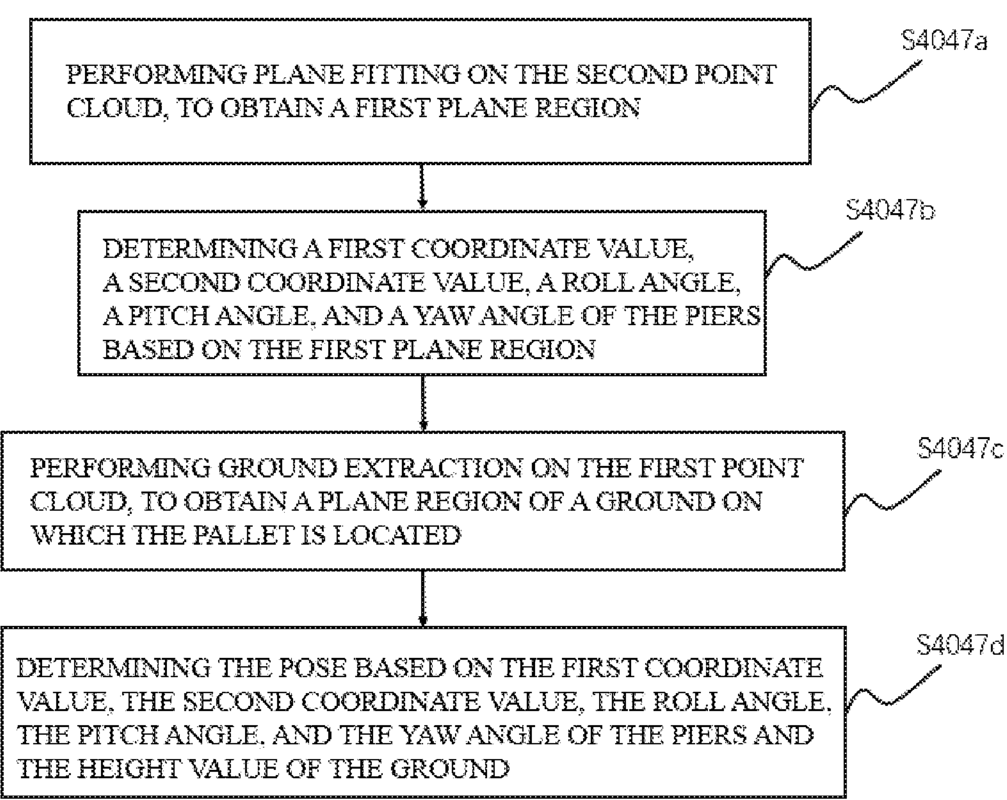
FIG. 11 is a schematic diagram of a specific procedure of determining a second pose based on a second point cloud according to some other embodiments of the present disclosure.

FIG. 11 is a schematic diagram of a specific procedure of determining a second pose based on a second point cloud according to some other embodiments of the present disclosure. In some embodiments corresponding to FIG. 11, the material handling equipment 10 includes an automated guided forklift, the carrier 20 is a pallet, the pallet includes piers and pier holes, and the second pose is a pose of the piers. In this case, the determining the pose based on the second point cloud may include action S4047*a*, action S4047*b*, action S4047*c*, and action S4047*d*.

Action S40467*a*: Perform plane fitting on the second point cloud, to obtain a first plane region. In some embodiments of the present disclosure, a method used for performing plane fitting on the second point cloud is the same as the schematic diagram of the specific procedure of performing plane fitting on the second point cloud shown in FIG. 10, and details are not described herein again. In some other embodiments of the present disclosure, actions shown in FIG. 10 may be performed separately or may be performed in combination.

Action S40467*b*: Determine a first coordinate value, a second coordinate value, a roll angle, a pitch angle, and a yaw angle of the piers based on the first plane region. After the plane equation corresponding to the second point cloud and the parameter of the plane equation are determined in action S40467*a*, a normal vector n=[a, b, c]$^T$ corresponding to the first plane region may be extracted from the plane equation. Then, coordinates (x, y, z) of a representative point in the first plane region are calculated. The coordinates (x, y, z) of the representative point are three-dimensional coordinate values. In some embodiments of the present disclosure, an X-axis coordinate value and a Y-axis coordinate value may be selected from the three-dimensional coordinate values as the first coordinate value and the second coordinate value of the piers. The representative point may be any point in the first plane region. The representative point may be one of a geometric center point, a center of mass point, a center of gravity point, or a lower edge center point of the first plane region. Subsequently, rotation angles, to be specific, the roll angle, the pitch angle, and the yaw angle, of the carrier around an X axis, a Y axis, and a Z axis may be calculated by using the normal vector n=[a, b, c]$^T$ and an upward vector with reference to a world coordinate system. In some embodiments, after a ground plane is obtained by performing fitting on a ground point cloud in the point cloud data obtained by the sensor, the normal vector may be calculated for the ground plane to obtain the upward vector. In some other embodiments, after an upper surface plane of the pallet is obtained by performing fitting on a point cloud of an upper surface of the pallet in the point cloud data obtained by the sensor, the normal vector may be calculated for the upper surface plane of the pallet to obtain the upward vector.

Action S40467*c*: Perform ground extraction on the first point cloud, to obtain a plane region of a ground on which the pallet is located, and determine a height value of the ground based on the plane region of the ground. In some implementations, a ground point cloud may be extracted from the first point cloud, plane fitting is performed on the ground point cloud, and then a height value of the plane is obtained based on a plane obtained through fitting.

Action S40467*d*: Determine the pose based on the first coordinate value, the second coordinate value, the roll angle, the pitch angle, and the yaw angle of the piers and the height value of the ground. Specifically, a transformation matrix from the carrier 20 to the material handling equipment 10 may be determined based on the first coordinate value, the second coordinate value, the roll angle, the pitch angle, and the yaw angle of the piers and the height value of the ground, and then the transformation matrix from the carrier 20 to the material handling equipment 10 represents the pose between the carrier 20 and the material handling equipment 10. It may be understood that the carrier 20 may be directly placed on the ground in most scenarios. In this case, the height value of the ground is used as a height value of the carrier 20, so that calculation efficiency can be improved and a calculation error is reduced.

Figure 12:
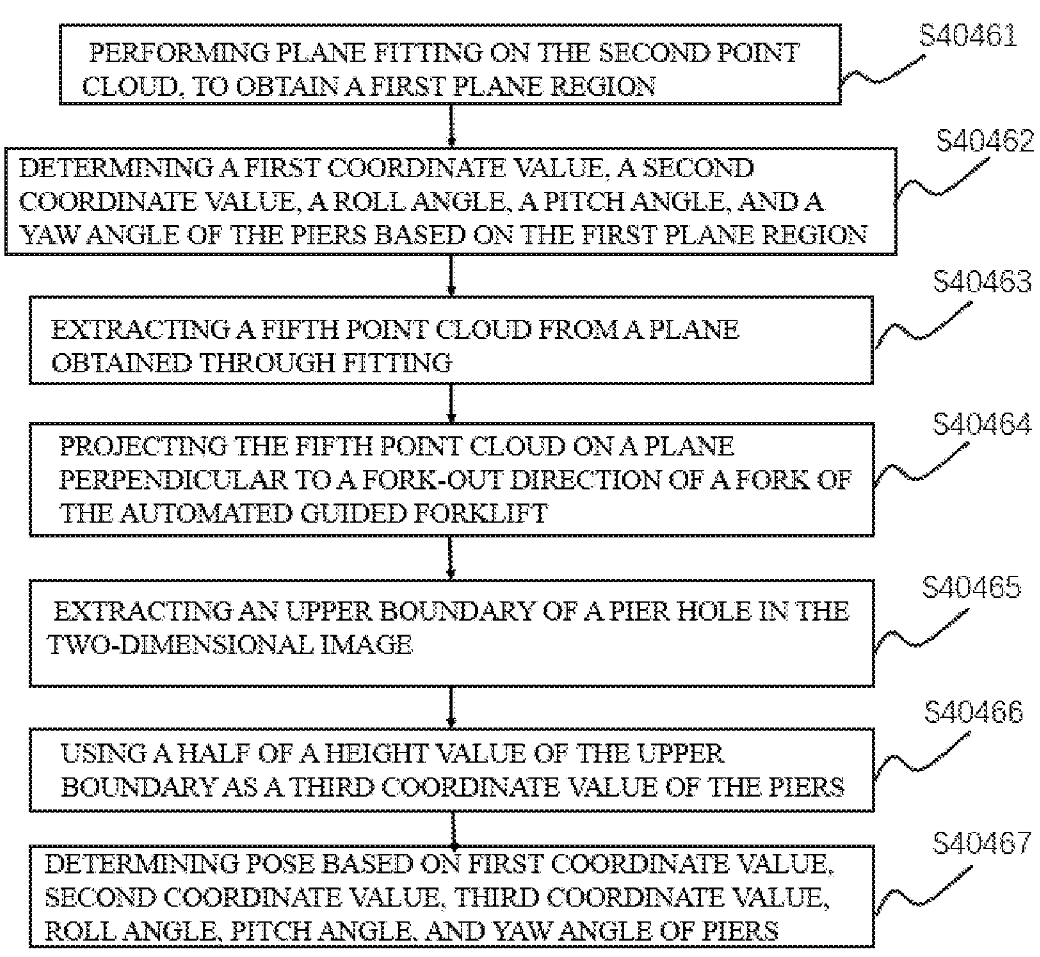
FIG. 12 is a schematic diagram of a specific procedure of determining a second pose based on a second point cloud according to some other embodiments of the present disclosure.

FIG. 12 is a schematic diagram of a specific procedure of determining a second pose based on a second point cloud according to some other embodiments of the present disclosure. In some embodiments corresponding to FIG. 12, the material handling equipment 10 includes an automated guided forklift, the carrier 20 is a pallet, the pallet includes piers and pier holes, and the pose is a pose of the piers. In this case, action S4046 may include action S40461, action S40462, action S40463, action S40464, action S40465, action S40466, and action S40467.

Action S40461: Perform plane fitting on the second point cloud, to obtain a first plane region. In some embodiments of the present disclosure, a method used for performing plane fitting on the second point cloud is the same as the schematic diagram of the specific procedure of performing plane fitting on the second point cloud shown in FIG. 10, and details are not described herein again. In some other embodiments of the present disclosure, actions shown in FIG. 10 may be performed separately or may be performed in combination.

Action S40462: Determine a first coordinate value, a second coordinate value, a roll angle, a pitch angle, and a yaw angle of the piers based on the first plane region. After the plane equation corresponding to the second point cloud and the parameter of the plane equation are determined in action S40461, a normal vector n=[a, b, c]$^T$ may be extracted from the plane equation. Then, coordinates (x, y, z) of a representative point in the first plane region are calculated. The coordinates (x, y, z) of the representative point are three-dimensional coordinate values. Any two coordinate values may be selected from the three-dimensional coordinate values as the first coordinate value and the second coordinate value of the piers. In some embodiments of the present disclosure, any X-axis coordinate value and Y-axis coordinate value may be selected from the three-dimensional coordinate values as the first coordinate value and the second coordinate value of the piers. The representative point may be any point in the first plane region. The representative point may be one of a geometric center point, a center of mass point, a center of gravity point, or a lower edge center point of the first plane region. Subsequently, the roll angle, the pitch angle, and the yaw angle of the pose of the carrier may be calculated by using the normal vector $n=[a, b, c]^T$ with reference to a world coordinate system.

Action S40463: Extract a fifth point cloud from a plane obtained through fitting. The fifth point cloud is points whose distances to the first plane region are less than a first distance threshold in the second point cloud. The first distance threshold is less than the second distance threshold in action **S4046*a*1**. In some embodiments of the present disclosure, the first distance threshold may be 3 cm. In some other embodiments of the present disclosure, the first distance threshold may alternatively be another value or value range.

Action S40464: Project the fifth point cloud on a plane perpendicular to a fork-out direction of a fork of the automated guided forklift, to obtain a two-dimensional image. The fifth point cloud may be projected into the two-dimensional image in any manner. In some other embodiments of the present disclosure, the fifth point cloud may be projected into the two-dimensional image through orthographic projection.

Action S40465: Extract an upper boundary of a pier hole in the two-dimensional image. A location of the pier hole may be found from the two-dimensional image, and the upper boundary of the pier hole is extracted. The upper boundary of the pier hole may be extracted from the two-dimensional image in any manner. In some embodiments of the present disclosure, the upper boundary of the pier hole may be extracted from the two-dimensional image by using a contour extraction operation (findContours) and a morphology operation (morphologyEx).

Action S40466: Use a half of a height value of the upper boundary as a third coordinate value of the piers. After the upper boundary of the pier hole is extracted, the height value of the upper boundary may be calculated. In some implementations, a height value of a midpoint of the upper boundary may be used as the height value of the upper boundary. In some implementations, an average height value of points of the upper boundary may be used as the height value of the upper boundary.

Action S40467: Determine the pose based on the first coordinate value, the second coordinate value, the third coordinate value, the roll angle, the pitch angle, and the yaw angle of the piers. A transformation matrix from the carrier 20 to the material handling equipment 10 may be determined based on the first coordinate value, the second coordinate value, the third coordinate value, the roll angle, the pitch angle, and the yaw angle of the piers, and then the transformation matrix from the carrier 20 to the material handling equipment 10 represents the relative pose between the carrier 20 and the material handling equipment 10.

In some embodiments of the present disclosure, between action S40463 and action S40464, action S4046 further includes: calculating minimum/maximum coordinates of the fifth point cloud in three-dimensional space, to construct a voxel grid; allocating the points in the fifth point cloud to the corresponding voxel grid; aggregating the fifth point cloud within the same voxel grid, to calculate second representative points of the voxel grid; and replacing all points in the voxel grid with the second representative points of the voxel grid. The representative point may be any point in the voxel grid. The representative point may be a center of mass in the voxel grid, a center point in the voxel grid, a point farthest from a voxel center in the voxel grid, an extremum point on a coordinate axis (X/Y/Z) in the voxel grid, a lower limit point in the voxel grid, or the like.

Figure 13:
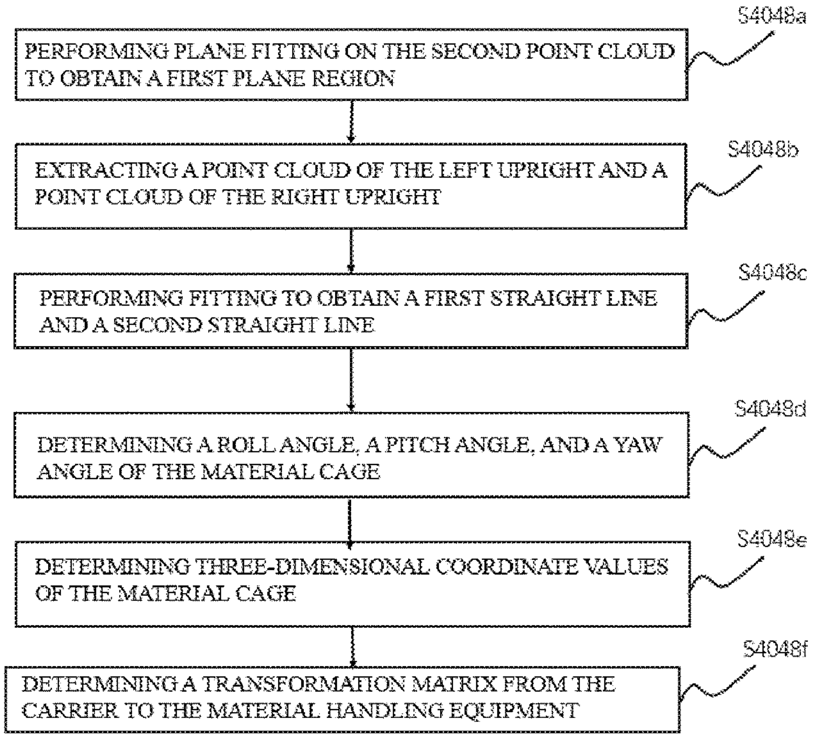
FIG. 13 is a schematic diagram of a specific procedure of determining a second pose based on a second point cloud according to some other embodiments of the present disclosure.

FIG. 13 is a schematic diagram of a specific procedure of determining a second pose based on a second point cloud according to some other embodiments of the present disclosure. In some embodiments corresponding to FIG. 13, the material handling equipment 10 includes an automated guided forklift, the carrier 20 is a material cage, the material cage includes a left upright and a right upright, and the pose is a pose of the material cage. In this case, S4048 of determining the second pose based on the second point cloud may include action **S4048*a*, action S4048*b*, S4048*c*, S4048*d*, S4048*e*, and S4048*f***.

Action **S4048*a*: Perform plane fitting on the second point cloud, to obtain a first plane region. In some embodiments of the present disclosure, a method used for performing plane fitting on the second point cloud is the same as the schematic diagram of the specific procedure of performing plane fitting on the second point cloud shown in FIG. 10, and details are not described herein again. In some other embodiments of the present disclosure, actions shown in FIG. 10** may be performed separately or may be performed in combination. Because the material cage generally includes the left upright and the right upright, the left upright and the right upright are fitted into a plane, to obtain the first plane region, so that accuracy of a fitting result can be provided.

Action **S4048*b***: Extract a point cloud of the left upright and a point cloud of the right upright in point clouds whose distances to the first plane region are within a preset distance range. In some implementations, a size and shape feature of the left upright and a size and shape feature of the right upright may be inputted to the controller as a preset template. Therefore, the point cloud of the left upright and the point cloud of the right upright may be extracted from the corresponding point cloud of the first plane region based on the size and shape feature of the left upright, the size and shape feature of the right upright, and position distribution on left and right.

Action **S4048*c***: Perform fitting based on the point cloud of the left upright and the point cloud of the right upright, to obtain a first straight line corresponding to the point cloud of the left upright and a second straight line corresponding to the point cloud of the right upright, the first straight line and the second straight line being constrained, during fitting, to be two straight lines that are parallel within a preset angle error range. In some embodiments of the present disclosure, the preset angle error range ranges from −1° to 1°. In some other embodiments of the present disclosure, the preset angle error range may alternatively be another value range. In some embodiments of the present disclosure, the first straight line corresponding to the point cloud of the left upright and the second straight line corresponding to the point cloud of the right upright may be obtained through fitting by using a least squares method. In some other embodiments of the present disclosure, the first straight line corresponding to the point cloud of the left upright and the second straight line corresponding to the point cloud of the right upright may alternatively be obtained through fitting by using a random sample consensus (RANSAC) algorithm. In some embodiments of the present disclosure, whether the first straight line and the second straight line are parallel within the preset angle error range may be determined by calculating an angle between a direction vector of the first straight line and a direction vector of the second straight line.

Action S4048*d*: Determine a roll angle, a pitch angle, and a yaw angle of the material cage. Specifically, a normal vector corresponding to the first plane region may be determined based on the first plane region, and the yaw angle of the material cage may be determined based on a projection of the normal vector on a plane of the X-axis and the Y-axis of the world coordinate system. In some embodiments of the present disclosure, an upward vector may be determined based on the first straight line and the second straight line, and rotation angles, to be specific, the roll angle, the pitch angle, and the yaw angle, of the material cage around the X axis, the Y axis, and the Z axis may be calculated by using the upward vector and the normal vector of the first plane region in combination with the world coordinate system. In a specific embodiment, a middle straight line between the first straight line and the second straight line may be obtained, and a direction along the middle straight line and from a low height position value to a high height position value is used as the upward vector. The pitch angle of the material cage may be determined based on a component of the normal vector of the first plane region on the Z axis. In addition, a virtual upward vector in a state in which a roll angle is zero is calculated based on the normal vector of the first plane region, and then the roll angle of the material cage is determined based on a difference between the virtual upward vector and the upward vector determined based on the first straight line and the second straight line. In some other embodiments of the present disclosure, after a ground plane is obtained by performing fitting on a ground point cloud in the point cloud data obtained by the sensor, the normal vector may be calculated for the ground plane to obtain the upward vector. Further, the rotation angles, to be specific, the roll angle, the pitch angle, and the yaw angle, of the material cage around the X axis, the Y axis, and the Z axis may be calculated in combination with the normal vector of the first plane region and the world coordinate system.

Action S4048*e*: Determine three-dimensional coordinate values of the material cage. In some embodiments of the present disclosure, the three-dimensional coordinate values of the material cage are determined in the following manner: determining a first representative point of the point cloud of the left upright and a second representative point of the point cloud of the right upright; determining a position of a representative point of the material cage based on a center point between the first representative point and the second representative point; and using three-dimensional coordinate values of the position of the representative point of the material cage as the three-dimensional coordinate values of the material cage. In some embodiments of the present disclosure, the first representative point and the second representative point each may be one of a geometric center point, a center of mass point, a center of gravity point, or a lower edge center point of a plane of the upright.

Action S4048*f*: Determine a transformation matrix from the carrier 20 to the material handling equipment 10 based on the roll angle, the pitch angle, the yaw angle, and the three-dimensional coordinate values of the material cage, and then represent the first pose between the carrier 20 and the material handling equipment 10 by using the transformation matrix from the carrier 20 to the material handling equipment 10.

Action S406: Determine, based on the first pose and the second pose, an extrinsic parameter of the sensor relative to the material handling equipment.

Figure 14:
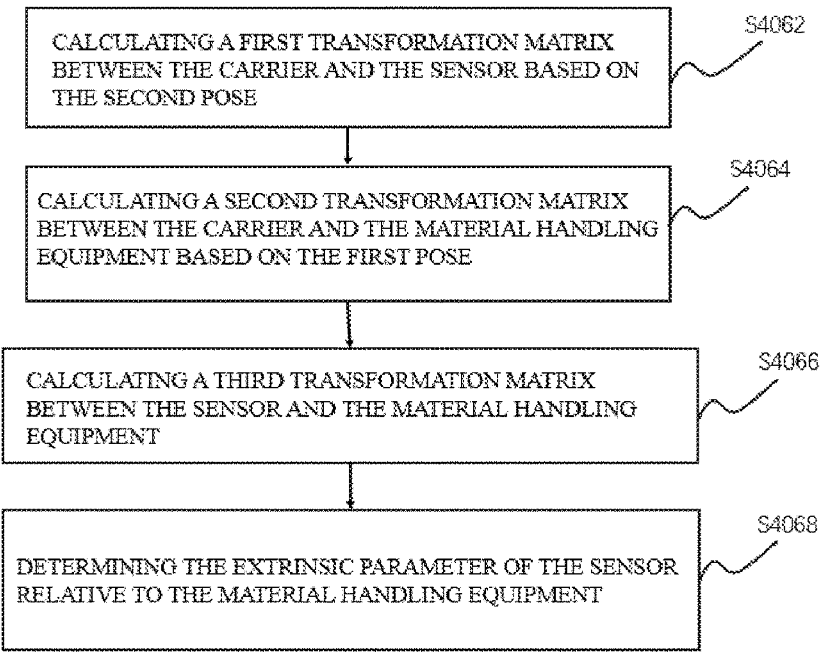
FIG. 14 is a schematic diagram of a specific procedure of determining, based on a first pose and a second pose, an extrinsic parameter of a sensor relative to a material handling equipment according to some embodiments of the present disclosure.

FIG. 14 is a schematic diagram of a specific procedure of determining, based on a first pose and a second pose, an extrinsic parameter of a sensor relative to a material handling equipment according to some embodiments of the present disclosure.

As shown in FIG. 14, action S406 includes action S4062, action S4064, action S4066, and action S4068.

Action S4062: Calculate a first transformation matrix between the carrier and the sensor based on the second pose. Specifically, a position and a posture may be determined based on the pose. The position may be represented by using the three-dimensional coordinate values, and the posture may be represented by using the roll angle, the pitch angle, and the yaw angle. Then, the first transformation matrix between the carrier and the sensor may be calculated based on the three-dimensional coordinate values, the roll angle, the pitch angle, and the yaw angle.

Action S4064: Calculate a second transformation matrix between the carrier and the material handling equipment based on the first pose. A method for calculating the second transformation matrix is similar to that in action S4062, and details are not described herein again.

Action S4066: Calculate a third transformation matrix between the sensor and the material handling equipment based on the first transformation matrix and the second transformation matrix. In some embodiments of the present disclosure, action S4066 includes: calculating an inverse matrix of the first transformation matrix, to obtain a transformation matrix from the sensor to the carrier; and then multiplying the second transformation matrix by the inverse matrix of the first transformation matrix, to obtain the third transformation matrix between the sensor and the material handling equipment.

Action S4068: Determine, based on the third transformation matrix, the extrinsic parameter of the sensor relative to the material handling equipment. Specifically, the third transformation matrix includes information about a translation vector and a rotation matrix. The translation vector corresponds to three-dimensional coordinate values of the sensor in a coordinate system of the material handling equipment. The rotation matrix includes a roll angle, a pitch angle, and a yaw angle of the sensor in the coordinate system of the material handling equipment. The roll angle, the pitch angle, and the yaw angle of the sensor in the coordinate system of the material handling equipment may be extracted from the rotation matrix through mathematical calculation. The three-dimensional coordinate values, the roll angle, the pitch angle, and the yaw angle of the sensor in the coordinate system of the material handling equipment are the extrinsic parameters of the sensor relative to the material handling equipment.

In some implementations, after the extrinsic parameter of the sensor relative to the material handling equipment is determined, the material handling equipment can accurately recognize the spatial relationship between the environment and the material handling equipment 10 by using sensing data of the sensor, and the material handling equipment can be controlled to accurately fork the carrier and the cargo. In some implementations, after the extrinsic parameter of the sensor relative to the material handling equipment is determined, a warehouse map may be created by using sensing data of the sensor, path planning and navigation may be performed on the material handling equipment based on the sensing data of the sensor, the cargo may be taken out and handled based on the sensing data of the sensor, an obstacle in the environment may be bypassed based on the sensing data of the sensor, or the material handling equipment may be controlled to be aimed at a detection object to handle the cargo. In other words, in some embodiments, according to the method for determining the extrinsic parameter shown in FIG. 4, after the extrinsic parameter of the sensor relative to the material handling equipment is determined, the material handling equipment may be controlled to execute a movement task based on the sensing data of the sensor. In this way, the extrinsic parameter can be calibrated without additionally preparing a high-precision calibration target that is not deformed, so that the material handling equipment is safer and more reliable in a cargo handling process, thereby facilitating safe handling performed by the material handling equipment.

The material handling equipment, the controller, and the method for determining the extrinsic parameter provided in the embodiments of the present disclosure have the following advantages: (1) in the present disclosure, the extrinsic parameter from the sensor to the material handling equipment is calibrated based on the carrier, and the extrinsic parameter can be calibrated without additionally preparing a high-precision calibration target that is not deformed, so that calibration is more convenient and requires lower costs; (2) according to the method for calibrating the extrinsic parameter from the sensor to the material handling equipment by using the carrier in the present disclosure, because the coordinate value of one of the three-dimensional coordinates is directly obtained by setting the relative position between the material handling equipment and the carrier, for example, through measurement or detection, the finally calculated extrinsic parameter from the sensor to the material handling equipment can be more accurate; and (3) calibration in the present disclosure can use a plurality of carriers in warehousing and logistics, and after the extrinsic parameter from the sensor to the material handling equipment changes, calibration may be directly performed again by using the existing corresponding carriers, so that flexibility is high.

It should be noted that reference to "some embodiments of the present disclosure" or similar terms throughout this specification means that a particular feature, structure, or characteristic described together with another embodiment is included in at least one embodiment and may not necessarily be presented in all the embodiments. Therefore, corresponding appearances of the phrase "some embodiments of the present disclosure" or similar terms in various places throughout this specification do not necessarily refer to a same embodiment. In addition, the particular feature, structure, or characteristic of any particular embodiment may be combined with one or more other embodiments in any suitable manner.

Technical content and technical features of the present invention are disclosed above. However, a person skilled in the art may still make replacements and modifications based on the teachings and the disclosures of the present invention without departing from the spirit of the present invention. Therefore, the protection scope of the present invention shall not be limited to the content disclosed in the embodiments, but shall include various replacements and modifications that do not depart from the present invention and are covered by the claims of this patent application.

We claim:

1. A material handling equipment, comprising a controller, the controller being configured to execute program instructions, to implement the following actions:

obtaining a relative pose between a carrier and the material handling equipment as a first pose arranging a carrier and the material handling equipment at a preset relative pose and obtaining a first pose between the carrier and the material handling equipment based on the preset relative pose;

obtaining a second pose by using a sensor, the second pose being a pose of the carrier or a pose of a partial structure of the carrier; and determining, based on the first pose and the second pose, an extrinsic parameter of the sensor relative to the material handling equipment; and controlling the material handling equipment to execute a handling task according to the extrinsic parameter.

2. The material handling equipment according to claim 1, wherein arranging a carrier and the material handling equipment at a preset relative pose and obtaining a first pose between the carrier and the material handling equipment based on the preset relative pose the obtaining a relative pose between a carrier and the material handling equipment as a first pose comprises:

aligning a center of the carrier with a center of the material handling equipment, to enable two of three-dimensional relative coordinate values of the carrier and the material handling equipment to be zero, and enable a relative roll angle, a relative pitch angle, and a relative yaw angle of the carrier and the material handling equipment to be preset values;

obtaining another relative coordinate value of the three-dimensional relative coordinates; and calculating the first pose between the carrier and the material handling equipment based on the three-dimensional relative coordinate value, the relative roll angle, the relative pitch angle, and the relative yaw angle.

3. The material handling equipment according to claim 1, wherein the obtaining a second pose by using a sensor comprises:

obtaining a first point cloud by using the sensor, the first point cloud being a point cloud obtained by sensing at least a partial structure of the carrier;

extracting a second point cloud from the first point cloud; and determining the second pose based on the second point cloud.

4. The material handling equipment according to claim 3, wherein the extracting a second point cloud from the first point cloud comprises:

extracting, from the first point cloud, a point cloud conforming to a preset feature, as the second point cloud, the preset feature being a feature corresponding to at least the partial structure of the carrier.

5. The material handling equipment according to claim 4, wherein the carrier is a pallet, and the preset feature comprises one or more of the following features:

one or more parameters of piers of the pallet: a height of the piers, a width of the piers, a quantity of the piers, and a distance between center points of the piers;

one or more parameters of pier holes of the pallet: a height of the pier holes, a width of the pier holes, a quantity of the pier holes, a distance between center points of the pier holes, and a ratio of a region of the pier holes to a region of a pier surface;

one or more parameters of beams of the pallet: a height of upper beams of the pallet, a width of the upper beams of the pallet, a height of lower beams of the pallet, and a width of the lower beams of the pallet;

one or more features of the pallet: a height of the pallet, a width of the pallet, and a shape of the pallet;

an area of the piers of the pallet;

an area of the pier holes of the pallet; or continuity of the upper beams of the pallet or the lower beams of the pallet.

6. The material handling equipment according to claim 4, wherein the extracting, from the first point cloud, a point cloud conforming to a preset feature, as the second point cloud comprises:

projecting the first point cloud into a two-dimensional image;

converting the two-dimensional image into a grayscale image and a binary image;

performing convolutional detection on the grayscale image, to obtain a convolution result;

determining, based on the convolution result, a relevant region related to the preset feature in the grayscale image;

corresponding the relevant region in the grayscale image to the binary image, to obtain a relevant region related to the preset feature in the binary image;

extracting an image feature from the relevant region in the binary image; and determining a point cloud corresponding to the relevant region in the grayscale image as the second point cloud when the image feature conforms to the preset feature within a preset tolerance range.

7. The material handling equipment according to claim 6, wherein the determining, based on the convolution result, a relevant region related to the preset feature in the grayscale image comprises: performing non-maximum suppression NMS on the convolution result.

8. The material handling equipment according to claim 3, wherein the obtaining a second pose by using a sensor further comprises:

performing the following actions on the first point cloud when the material handling equipment is of a first type:

performing downsampling on the first point cloud, to obtain a third point cloud;

filtering out a point in the third point cloud, to obtain a fourth point cloud, an angle between a normal of the point and a normal of an adjacent point being greater than a first threshold; and filtering out a point whose outlier value reaches a second threshold in the fourth point cloud.

9. The material handling equipment according to claim 8, wherein the obtaining a second pose by using a sensor further comprises:

performing the following actions on the first point cloud when the material handling equipment is not of the first type:

performing downsampling on the first point cloud, to obtain a third point cloud; and identifying and removing a trailing point in the third point cloud.

10. The material handling equipment according to claim 3, wherein the extracting a second point cloud from the first point cloud further comprises: performing region-of-interest clipping on the first point cloud, and extracting the second point cloud from a point cloud obtained through clipping.

11. The material handling equipment according to claim 3, wherein the determining the second pose based on the second point cloud comprises:

performing plane fitting on the second point cloud, to obtain a first plane region;

determining a three-dimensional coordinate value, a roll angle, a pitch angle, and a yaw angle of at least the partial structure of the carrier based on the first plane region; and calculating the second pose based on the three-dimensional coordinate value, the roll angle, the pitch angle, and the yaw angle.

12. The material handling equipment according to claim 3, wherein the material handling equipment comprises an automated guided forklift, the carrier is a pallet, the pallet comprises piers and pier holes, and the second pose is a pose of the piers; and the calculating the second pose based on the second point cloud comprises:

performing plane fitting on the second point cloud, to obtain a first plane region;

determining a first coordinate value, a second coordinate value, a roll angle, a pitch angle, and a yaw angle of the piers based on the first plane region;

performing ground extraction on the first point cloud, to obtain a plane region of a ground on which the pallet is located, and determining a height value of the ground based on the plane region of the ground; and determining the second pose based on the first coordinate value, the second coordinate value, the roll angle, the pitch angle, and the yaw angle of the piers and the height value.

13. The material handling equipment according to claim 3, wherein the material handling equipment comprises an automated guided forklift, the carrier is a pallet, the pallet comprises piers and pier holes, and the second pose is a pose of the piers; and the calculating the second pose based on the second point cloud comprises:

performing plane fitting on the second point cloud, to obtain a first plane region;

determining a first coordinate value, a second coordinate value, a roll angle, a pitch angle, and a yaw angle of the piers based on the first plane region;

extracting a fifth point cloud from a plane obtained through fitting, the fifth point cloud being points whose distances to the first plane region are less than a first distance threshold in the second point cloud;

projecting the fifth point cloud on a plane perpendicular to a fork-out direction of a fork of the automated guided forklift, to obtain a two-dimensional image;

extracting an upper boundary of a pier hole in the two-dimensional image;

using a half of a height value of the upper boundary as a third coordinate value of the piers; and determining the second pose based on the first coordinate value, the second coordinate value, the third coordinate value, the roll angle, the pitch angle, and the yaw angle of the piers.

14. The material handling equipment according to claim 13, wherein before the projecting the fifth point cloud on a plane perpendicular to a fork-out direction of a fork of the automated guided forklift, the actions further comprise:

calculating minimum/maximum coordinates of the fifth point cloud in three-dimensional space, to construct a voxel grid;

allocating the points in the fifth point cloud to the corresponding voxel grid;

aggregating the fifth point cloud within the same voxel grid, to calculate second representative points of the voxel grid; and replacing all points in the voxel grid with the second representative points of the voxel grid.

15. The material handling equipment according to claim 12, wherein the performing plane fitting on the second point cloud comprises: performing plane fitting on the second point cloud based on a second distance threshold.

16. The material handling equipment according to claim 12, wherein the performing plane fitting on the second point cloud comprises:

performing plane fitting on the second point cloud based on a second distance threshold; and performing least squares plane fitting on the second point cloud on which plane fitting is already performed.

17. The material handling equipment according to claim 1, wherein the determining, based on the first pose and the second pose, an extrinsic parameter of the sensor relative to the material handling equipment comprises:

calculating a first transformation matrix between the carrier and the sensor based on the second pose;

calculating a second transformation matrix between the carrier and the material handling equipment based on the first pose;

calculating a third transformation matrix between the sensor and the material handling equipment based on the first transformation matrix and the second transformation matrix; and determining, based on the third transformation matrix, the extrinsic parameter of the sensor relative to the material handling equipment.

18. A controller, configured to execute program instructions, to perform the following actions:

obtaining a relative pose between a carrier and a material handling equipment as a first pose arranging a carrier and the material handling equipment at a preset relative pose and obtaining a first pose between the carrier and the material handling equipment based on the preset relative pose;

obtaining a second pose by using a sensor, the second pose being a pose of the carrier or a pose of a partial structure of the carrier; and determining, based on the first pose and the second pose, an extrinsic parameter of the sensor relative to the material handling equipment; and controlling the material handling equipment to execute a handling task according to the extrinsic parameter.

19. A method for determining an extrinsic parameter, the method comprising:

obtaining a relative pose between a carrier and a material handling equipment as a first pose arranging a carrier and the material handling equipment at a preset relative pose and obtaining a first pose between the carrier and the material handling equipment based on the preset relative pose;

obtaining a second pose by using a sensor, the second pose being a pose of the carrier or a pose of a partial structure of the carrier; and determining, based on the first pose and the second pose, an extrinsic parameter of the sensor relative to the material handling equipment; and controlling the material handling equipment to execute a handling task according to the extrinsic parameter.

* * * * *